United States Patent [19]
Saliba et al.

[11] Patent Number: 5,803,388
[45] Date of Patent: Sep. 8, 1998

[54] TAPE REEL WITH FLANGE SECTIONS FOR UNIFORM TAPE STACKING

[75] Inventors: George Saliba, Northboro; Joseph Panish, Littleton, both of Mass.

[73] Assignee: Quantum Corporation, Milpitas, Calif.

[21] Appl. No.: 749,598

[22] Filed: Nov. 15, 1996

[51] Int. Cl.$^6$ .................................................. G03B 23/06
[52] U.S. Cl. ........................................... 242/348; 242/614
[58] Field of Search ................................. 242/345, 345.2, 242/118.4, 613, 614, 610.6, 348

[56] References Cited

U.S. PATENT DOCUMENTS

| | | | |
|---|---|---|---|
| 1,861,882 | 6/1932 | Ross | 242/614 X |
| 3,401,899 | 9/1968 | Goldberg | 242/345 X |
| 3,650,389 | 3/1972 | Mook | 242/614 X |
| 4,085,907 | 4/1978 | Suzuki et al. | 242/345.2 |
| 5,474,253 | 12/1995 | Kasetty et al. | 242/345 X |

FOREIGN PATENT DOCUMENTS 8105716  7/1983  Netherlands ............................ 242/614

OTHER PUBLICATIONS

IBM Technical Disclosure Bulletin, vol. 5, No. 1 Jun. 1962.

*Primary Examiner*—Daniel P. Stodola
*Assistant Examiner*—Gregory J. Strimbu
*Attorney, Agent, or Firm*—David B. Harrison; John C. Chen

[57] ABSTRACT

A tape drive reel for providing controlled, uniform stacking of tape during read/write operations to reduce lateral tape motion. The reel comprises a hub and two flanges that are located on opposite sides of the hub. Each flange includes a deflectable radial section which pivots about the hub as tape is wound onto the reel. As each loop of tape is wound on the hub and the amount of tape stacked thereon increases, the radial sections of the flanges are deflected towards each other and against the opposite edges of the tape stack, ensuring that the tape stacks uniformly.

17 Claims, 7 Drawing Sheets

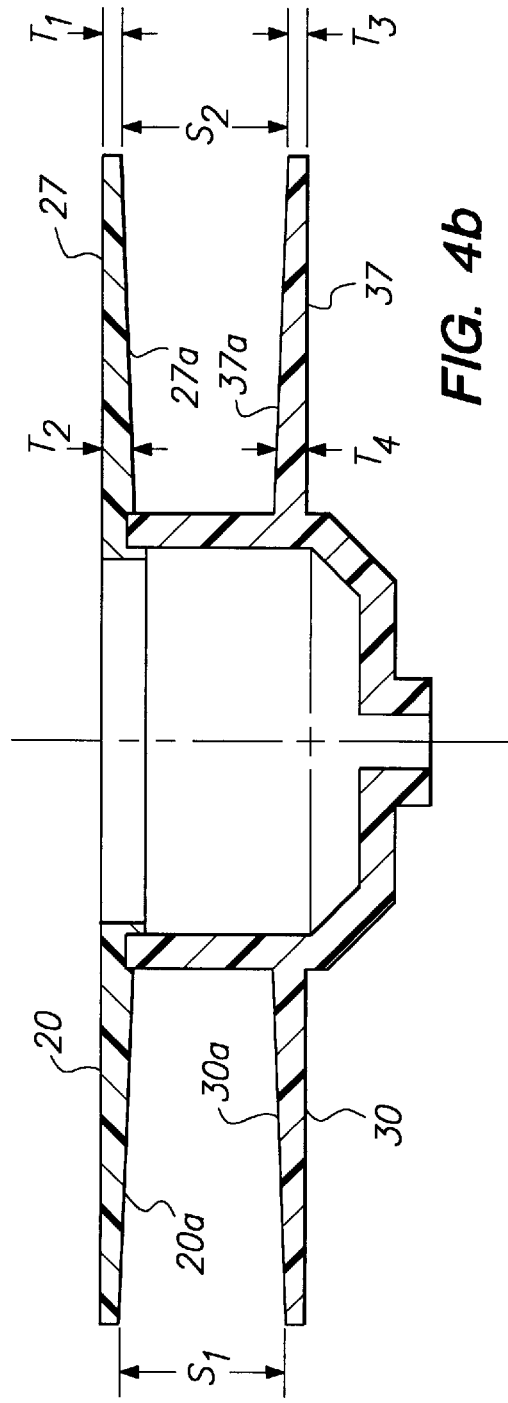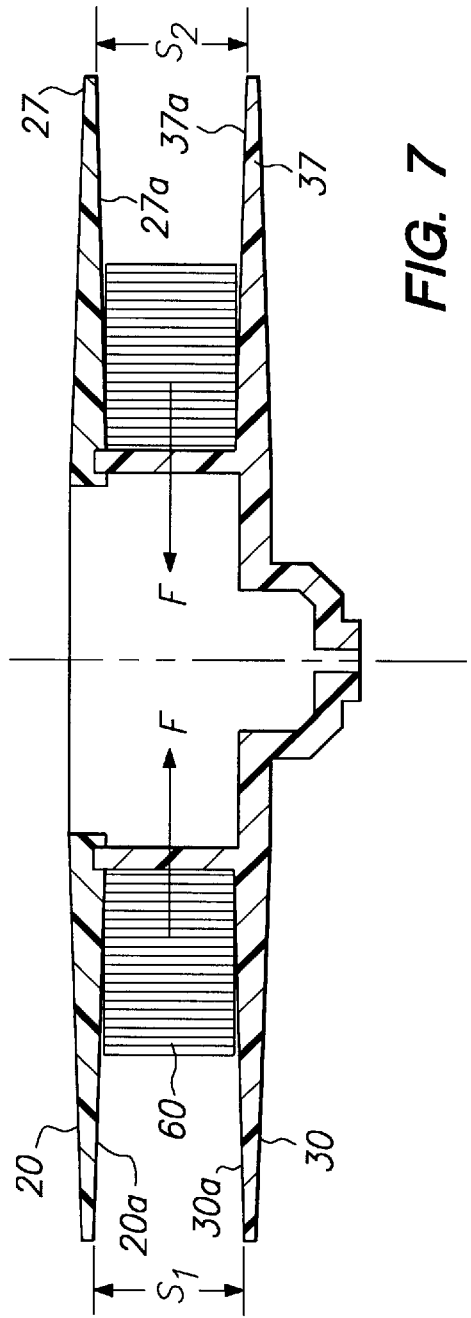

TAPE REEL WITH FLANGE SECTIONS FOR UNIFORM TAPE STACKING

FIELD OF THE INVENTION

The present invention relates generally to magnetic recording tape reels. More particularly, the present invention relates to a low cost tape reel which provides uniform tape stacking as the tape is spooled onto the reel.

BACKGROUND OF THE INVENTION

Magnetic tapes are used for data storage in computer systems requiring data removability, low cost data storage, high data rate capability, high volumetric efficiency and reusability. Magnetic tapes include open reels, tape cartridges and cassettes. In the past the container most commonly used to house magnetic tape was the open reel. A simple reel, consisting of a hub upon which the tape is wound and flanges which protect the tape edges, has been used for more than three decades. However, the need for additional tape protection and a reduction in the need for human intervention has led to the use of tape cartridges and cassettes. A cartridge denotes a single reel of tape in a machine-usable container, while a cassette includes a take up reel as well as the supply reel. Take-up reels are used in magnetic tape drives to spool tape from a tape cartridge or from a reel while information is either written on or read from the tape.

The need to record large amounts of information to achieve high data rate capability on tapes has been achieved through the use of parallel tracks on a tape. Greater the number of tracks, more information may be stored on the tape. Consequently, track separation on tapes have continued to decrease in order to accommodate more tracks. As a result, it has become very important to control lateral tape motion as the tape passes over a read/write head during read/write operations in order to ensure that the desired track is accurately positioned on the head.

As the tape moves between the supply reel and the take-up reel during operation, it must be guided over the read/write head in a precise manner. Excessive lateral tape motion is undesirable. Lateral tape motion is defined as the peak-to-peak distance of the undesirable movement (in-plane) of the tape perpendicular to its prescribed longitudinal direction of motion past the head. Lateral tape motion is a major limiting factor in determining the minimum width of a track and the minimum spacing between tracks on the tape. Thus, as lateral tape motion is reduced, more tracks may be stored on the tape and the tape density increases accordingly.

One approach to minimizing lateral tape motion has been to employ a tape guide system such as that disclosed in commonly assigned U.S. Pat. No. 5,414,585. This approach uses six roller guides which minimizes lateral tape movement as the tape streams through its travel path. The drawback of such a tape guide system is that it is not cost effective for low cost tape drives.

Another approach has been to ensure that tape stacks up uniformly on both the supply reel and the take-up reel. As shown in FIG. 1, it can be seen that as each individual loop stacks, the tape may slide laterally up or down as it spools around the reel, thereby stacking non-uniformly. Non-uniformly stacked tape causes the tape to experience lateral tape motion as it passes over the read/write head.

When tape spools on a reel, there is a tendency for air to be trapped between the outer surface of the wound tape and the incoming tape. Trapped air contributes to the tendency for tape to be wound non-uniformly. To prevent air from being trapped between the wound tape, tape tension may be increased to "squeeze" out any trapped air. However, increasing tape tension increases tape and head wear and hence, is not effective or preferred when using thin tapes.

Commonly assigned U.S. Pat. No. 5,474,253 used wedged reels to achieve uniform tape stacking. As illustrated in FIG. 2, the reels have flanges with opposing surfaces being separated by a distance which varies from a minimum at a location adjacent the hub to a maximum at the circumferential edge of the flanges in a radial direction extending outwardly from the axis of rotation. Further, the separation between the facing surfaces also increases from a minimum to a maximum along any path of equal distance around the axis of rotation. This type of reel requires exact taper and precision manufacturing setting. Thus, it is not suitable for low cost tape drives.

Thus, a hitherto unsolved need has remained for a low cost tape reel suitable for precise high density tape guiding.

SUMMARY OF THE INVENTION

The present invention is an apparatus for controlled, uniform stacking of tape during read/write operations in tape drives to reduce lateral tape motion during read/write operations. The invention comprises a hub and two flanges that are located on opposite sides of the hub. The flanges have surfaces facing each other extending outwardly from the hub. In addition, the flanges include at least one radial section which is pivotable about the hub as tape is wound around the hub. Each radial section is defined by two grooves cut out of each flange. The grooves extending from a proximity to the hub to the outer edge of the flange. The reel also includes a spring section defined on the hub, between the radial sections. The spring section absorbs a force exerted by the tape, as the tape is wound on the hub, causing the radial sections to pivot towards each other. During operation, as tape is wound on the reel, the force exerted on the hub causes the radial sections to pivot against the tape edges, thereby maintaining contact with the tape edges and ensuring uniform tape stacking. With such an arrangement, an increased number of data tracks may be stored on a magnetic tape media by minimizing lateral tape motion.

BRIEF DESCRIPTION OF THE DRAWINGS

FIG. 4b is a side cross-sectional view of the adaptive flange reel of FIG. 4a.

FIG. 6b is a partial view of FIG. 6a, detailing the dimensions of the cutout shown in FIG. 6a.

FIG. 6c is another partial view of FIG. 6a, showing the location of the elastomeric member in relation to the cutout of FIG. 6a.

FIG. 7 is a side cross-sectional view of the tape reel of FIG. 3, shown with uniform tape stacking.

DETAILED DESCRIPTION OF THE PREFERRED EMBODIMENT

The present invention is directed toward a low cost tape reel which reduces the overall cost of fabricating an 8 inch form factor tape drive. At the same time, the present invention also minimizes the amount of lateral tape motion relative to the tape head, enabling the tracks to be narrower and spaced closer together and thus, increasing the number of tracks stored on the tape.

Figure 1:
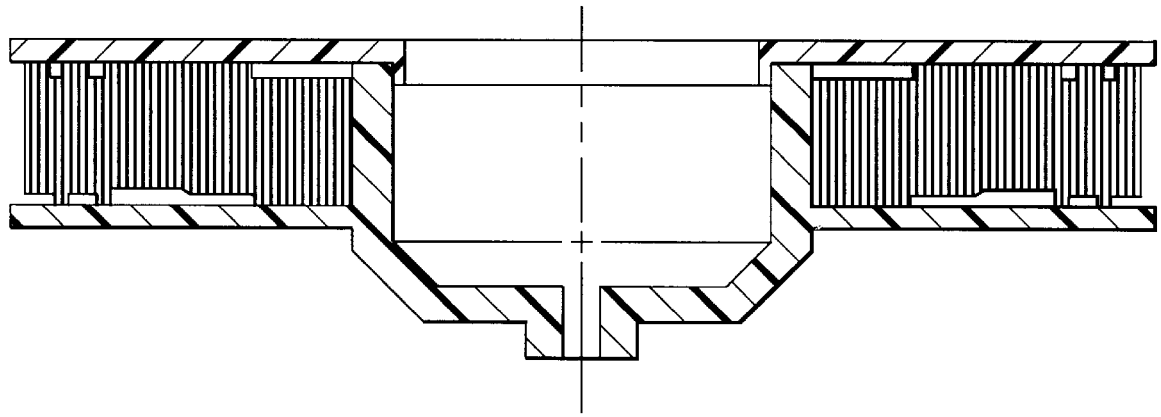
FIG. 1 is a side cross-sectional view of non-uniform tape stacking in a prior tape reel.
Figure 2:
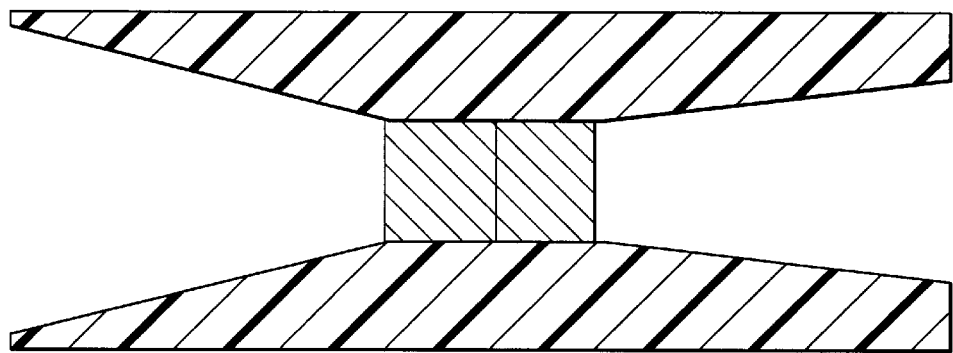
FIG. 2 is a side view of a prior art wedged tape reel.
Figure 3:
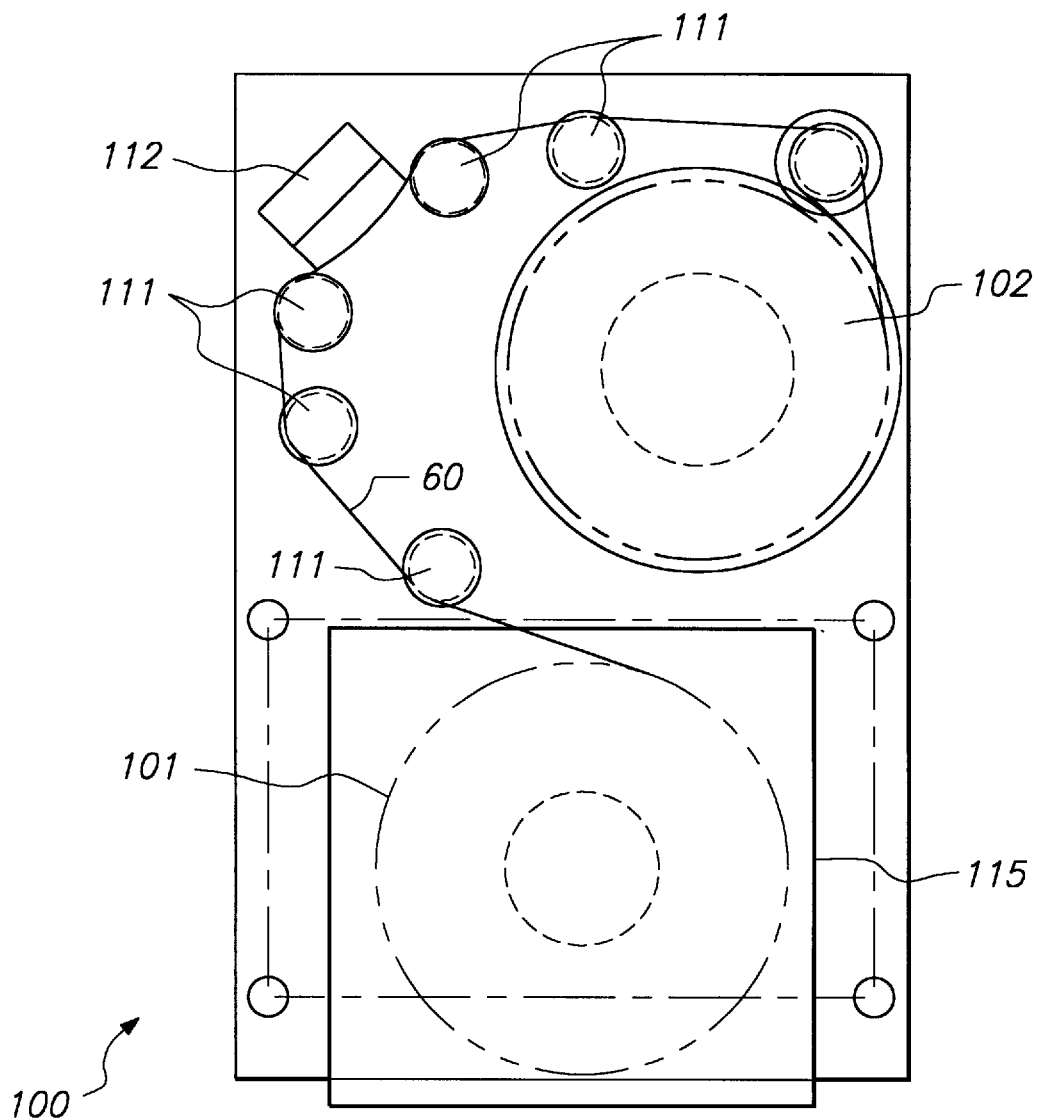
FIG. 3 is a plan view of a supply reel and take-up reel, in accordance with the present invention, shown in a tape drive arrangement.

Supply and take-up reels, according to the instant invention, are used in magnetic tape drives to spool tape while information is either written on the tape or read from it. As shown in FIG. 3, a tape drive 100 comprises a supply reel 101 having tape 60 spooled onto it, rollers 111 read/write head 112 and a take-up reel 102. The supply reel 101 is rotatably mounted within a removable cartridge 115. During a read/write operation, the tape 60 spools out of either the take-up reel 102 or the supply reel 101, with rollers 111 guiding the tape 60 as it passes over the read/write head 112 and then stacks up on the other reel, one loop after another, with increasing radius. For the purposes of ease of explanation the invention will be described with respect to supply reel 102. The same principles apply to take-up reel 101.

Figure 4A:
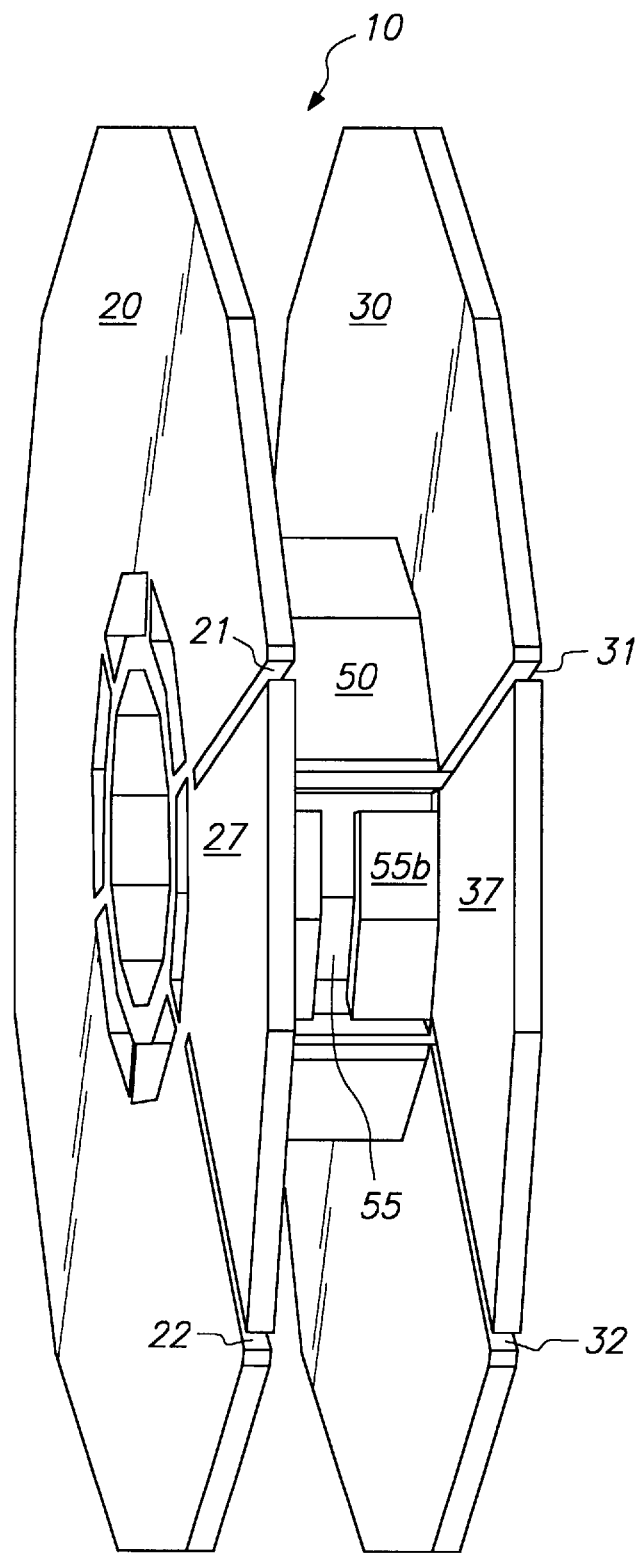
FIG. 4a is a plan view of the adaptive flange tape reel in accordance with the present invention.

Referring now to FIG. 4a, a plan view of an adaptive flange tape reel 10 according to the present invention is shown. The reel 10 includes a bottom flange 20 and a top flange 30 defined at opposite ends of a hub 50. The hub 50 is cylindrical as shown in FIG. 4a, however, other shapes may be used. The flanges are laterally separated by a distance slightly larger than the nominal width of the tape 60. Further, as shown in FIG. 4a, the flanges and the hub are made of polycarbonate material. However, other engineering material having stiffness similar to or higher than polycarbonate may be used instead.

Figure 5A:
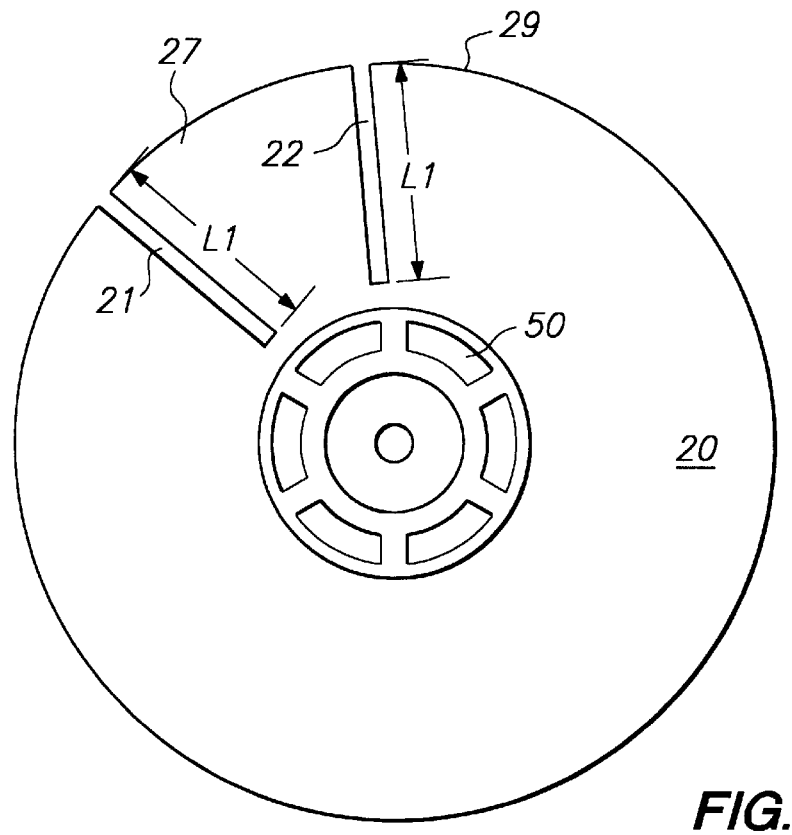
FIGS. 5a and 5b are side views in elevation of the tape reel of FIG. 3.
Figure 5B:
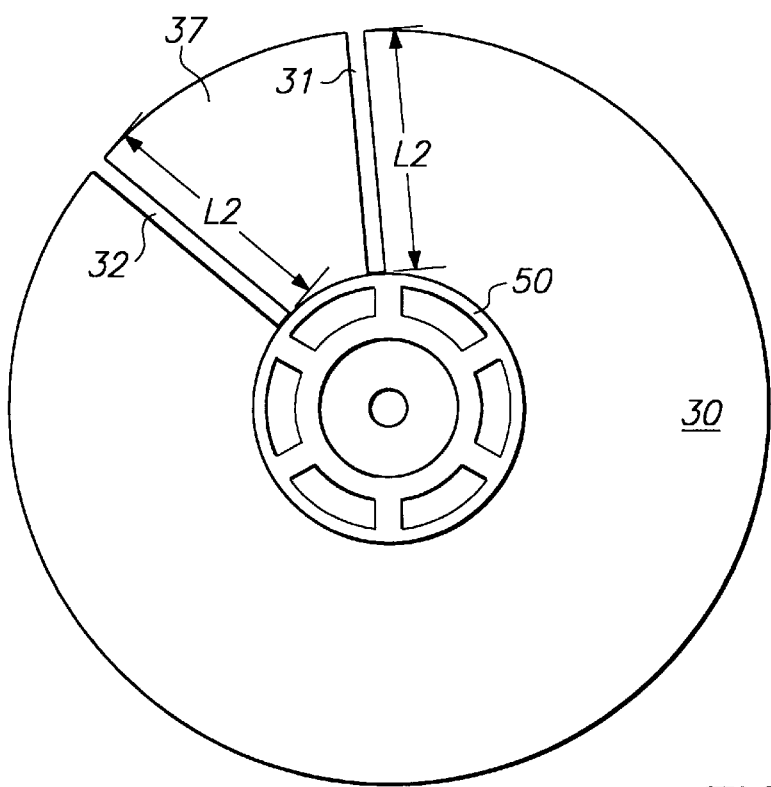
Figure 5C:
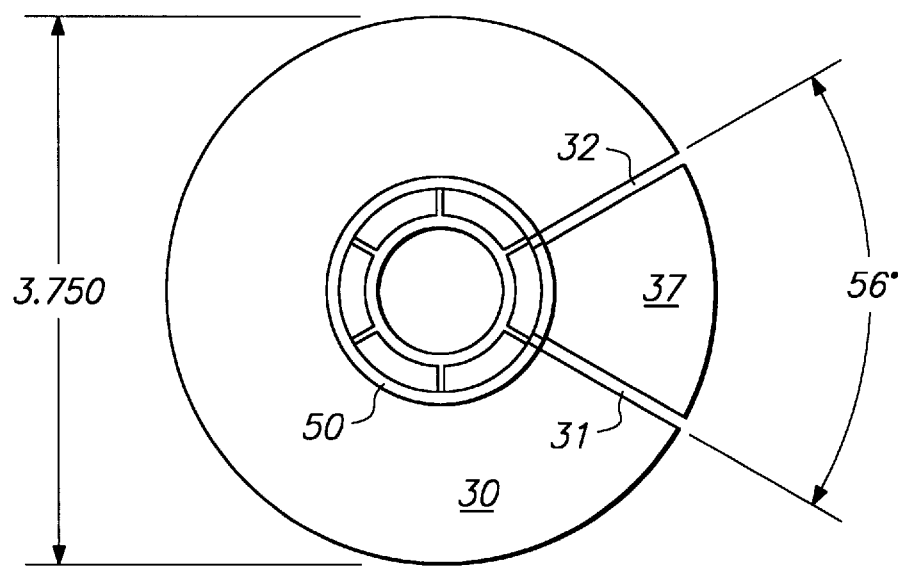
FIG. 5c is side view in elevation showing the dimensions of the reel and flange section.

As shown in FIG. 5a, the bottom flange 20 includes two radially extending grooves 21 and 22, cut away from the flange 20 to define a radial section 27. Each of the grooves 21 and 22 extend from the hub 50 to an outer edge 29 of the flange 20. Similarly, top flange 30 includes two radially extending grooves 31 and 32 cut away from the top flange 30 to define a radial section 37. Grooves 31 and 32 extend closer to the hub 50, as shown in FIGS. 5a and 5b such that the grooves on the top flange have a longer length L2 than the length L1 on bottom flange 20. In one embodiment, L2=1.005 inches and L2=1.045 inches. In the embodiment shown in FIG. 5c, the groves of each flange are separated by approximately 56°, relative to each other. The reel has a diameter of approximately 3.73 inches. As will be explained later, the radial sections 27 and 37 are deflectable about the hub 50 and contact the tape edges to ensure uniform stacking as the tape is spooled on the hub. Referring to FIG. 7, it can be seen that top flange 30 is integral with the hub 50 while bottom flange 20 is secured to hub 50 by suitable means e.g. fusion. Since top flange 30 is molded with the hub, radial section 37 exhibits greater rigidity than radial section 27. Therefore the added length on radial grooves 31 and 32 compensates for the higher rigidity, enabling both radial sections 27 and 37 to be simultaneously deflectable through the same amplitude (as will be explained below).

FIG. 4b provides a cross sectional view of the reel 10. As shown, the flanges 20 and 30 have a tapered cross section, wherein the thickness at the outer diameter is thinner than that at the inner diameter. In one preferred embodiment, bottom flange 20 has a cross sectional thickness at the outer diameter of T1=0.60 inches and a cross sectional thickness at the inner diameter of T2=0.066 inches. Similarly, top flange 30 is defined by an outer diameter thickness T3=0.65 inches and an inner diameter thickness T4=0.080 inches. Inner surfaces 20a and 30a of the flanges are separated by a distance S1 of approximately 0.694 inches, at the outer diameter of the flange. In an undeflected state, inner surfaces 27a and 37a of radial sections 27 and 37 are also separated by S2 of approximately 0.694 inches, at the outer diameter.

Figure 6A:
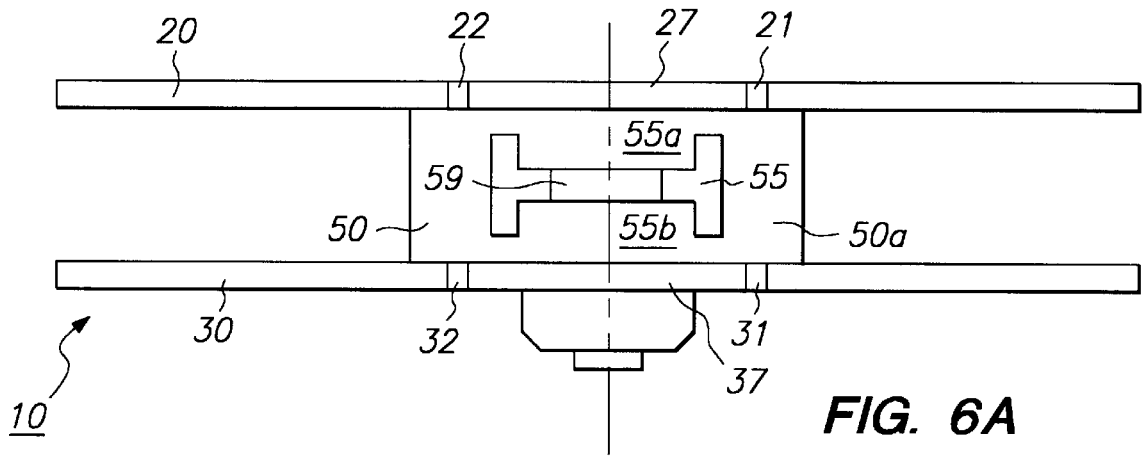
FIG. 6a is another side view in elevation of the tape reel of FIG. 3.

Referring to FIG. 6a, the hub 50 includes spring sections 55a and 55b, defined by an "I" shaped cut out 55 in the hub 50. The spring sections are defined between the radial sections 27 and 37 and include an elastomeric member 59 located underneath the cut out 55. The thickness of the elastomeric member 59 biases the spring sections 55a and 55b away from the hub surface 50a, as shown in FIG. 6c.

Figure 6B:
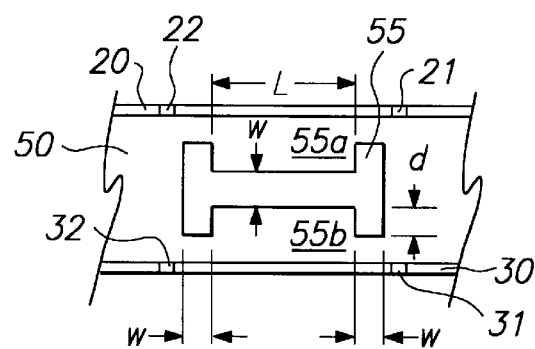
Figure 6C:
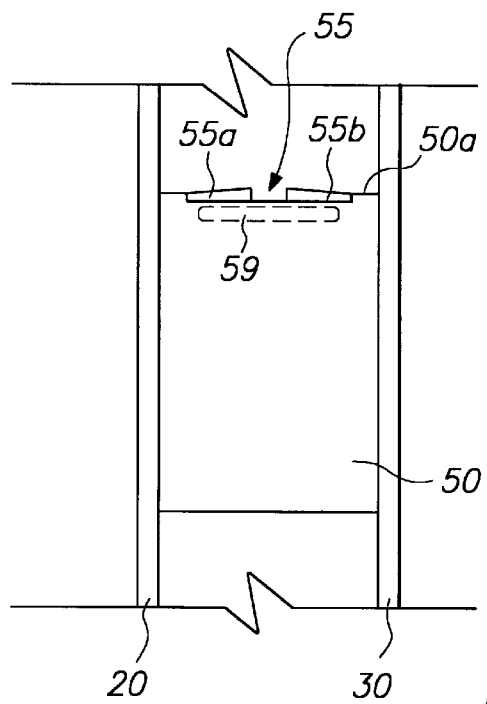

The details of cut out 55 are illustrated in FIG. 6b. As shown, cut out 55 is defined by an "I" shaped cut out, preferably having a thickness w of approximately 0.062 inches. The resulting spring sections 55a and 55b have a length L of approximately 0.676 inches and a width d of approximately 0.350 inches.

During operation, as each loop of tape is wound around the hub, a concentric radial force F is exerted against the hub 50 by the wound tape. Radial force F increases with each additional loop of wound tape such that when a full stack of tape is wound on the hub 50, force F is greater than when one loop of tape is wound. As force F increases, spring sections 55a and 55b are biased further against elastomeric member 59. The elasticity of elastomeric member 59 "absorbs" force F, enabling spring sections 55a and 55b to deflect. The deflection of spring sections 55a and 55b are transferred to radial sections 27 and 37 respectively, causing radial sections 27 and 37 to deflect towards each other. Accordingly, as more tape is stacked on the reel, radial sections 27 and 37 are deflected closer towards each other and against opposite edges of the stack of tape.

FIG. 7 illustrates the deflection of radial sections 27 and 37 against the tape 60 edges as radial force F is exerted against the hub 50 by a full stack of spooled tape. As shown, the tapered arrangement of the flanges enables the inside surfaces 27a and 37a of deflected radial sections 27 and 37 to eventually end up in a parallel relationship with the tape stack edges. This enables each inside surface 27a and 37a to contact the entire stack of tape, ensuring uniform tape stacking. As shown, at this position, the inner surfaces 27a and 37a are separated by a distance S2 of approximately 0.512. Note that the rest of the flanges 20 and 30 do not contact the tape stack. Thus, the inner surfaces 20a and 30a, of the flanges 20 and 30, remain separated, at the outer diameter, by the distance S1 of approximately 0.694 inches.

Conversely, as tape is unwound from the hub, the spring sections 55a and 55b, as well as radial sections 27 and 37 gradually return to their "unwound" positions, as shown in FIG. 4b.

Preferably, the spring sections 55a and 55b are dimensioned so that the radial sections 27 and 37 gradually deflect as more tape is spooled onto the hub, thereby maintaining contact with both edges of the tape to ensure uniform tape stacking. For example, in one preferred embodiment, it has been empirically shown that the relationship between the amplitude of deflection of top flange radial section 37 and the amount of tape wound on the hub is represented by:

R=0.694−[T×(0.068)]

wherein R represents the magnitude of deflection of radial section 37, T represents the percentage of tape stacked on the hub and 0.694, as mentioned above, represents the distance between the inner surfaces 27a and 37a, at the outer diameter, when there is no tape wound on the hub.

In addition, the relationship between the magnitude of deflection of the radial sections and the deflection of the spring sections has been empirically found to be represented by:

DS=(0.21)×R wherein DS represents the magnitude of deflection of the spring sections 55a and 55b and R is defined as above.

Therefore, the relationship between the magnitude of deflection of the spring section and the amount of tape wound on the hub may also be represented by:

DS=0.146−[T×(0.0143)]

wherein DS and T are defined as above.

The present invention provides a low cost reel which enables uniform tape stacking wherein the tape only contacts the radial sections 27 and 37 of the flanges, thereby reducing tape edge wear.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A reel for spooling tape uniformly thereon, the reel comprising:
    a hub rotatably mounted about an axis of rotation;
    two flanges, each flange having an outer surface and an inner surface, the flanges being located on opposite sides of the hub and being in spaced apart relationship along the axis of rotation, the inner surfaces of the flanges facing each other, the flanges extending outwardly from the hub in a diverging relationship with each other, each flange including at least one radial section, the at least one radial section being deflectable against a tape edge as the tape is spooled onto the hub to ensure uniform stacking of the tape; and
    each radial section being defined by a pair of radially extending groove cutouts, each groove cutout having a first end defined substantially adjacent the hub and a second end defined at an outer diameter edge of the flange.

2. The reel of claim 1 wherein the hub further includes a spring section defined between the radial sections, the spring section being deflectable by a radial force concentric with and exerted on the hub by the tape as the tape is spooled thereon.

3. The reel of claim 2 wherein the spring section is defined by an I-shaped cutout in the hub.

4. The reel of claim 3 wherein the spring section includes an elastomeric member for absorbing the radial force.

5. The reel of claim 4 wherein an elasticity of the elastomeric member causes the radial sections to return to a non-deflected position as the tape is un-spooled from the reel.

6. The reel of claim 2 wherein the deflectable spring section causes the radial sections to deflect towards each other such that when the tape is fully spooled on the reel, the inner surfaces of each radial section are in parallel relationship with each other.

7. The reel of claim 6 wherein the inner surfaces of the flanges are in contact with the tape edge when the tape is fully spooled on the reel.

8. The reel of claim 1 wherein one of the flanges is integral with the hub.

9. The reel of claim 8 wherein the first end of the grooves of the flange which is integral with the hub extends closer to the hub than the first end of the grooves on the other flange.

10. The reel of claim 1 wherein the groove cutouts are elongated.

11. The reel of claim 1 wherein the groove cut outs defining one of the radial sections are separated by approximately 56 degrees.

12. The reel of claim 1 wherein the flanges have a tapered cross-sectional thickness.

13. The reel of claim 12 wherein the cross-sectional thickness of each flange is greater at an inner diameter than at an outer diameter of the flange.

14. A tape cartridge supplying tape to and spooling tape from a tape drive, the cartridge comprising:
    a housing having at least two parallel walls;
    a hub rotatably mounted about an axis of rotation within the housing, between the two walls;
    two flanges, each flange having an outer surface and an inner surface, the flanges being located on opposite sides of the hub and being in spaced apart relationship along the axis of rotation, the inner surfaces of the flanges facing each other, the flanges extending outwardly from the hub in a diverging relationship with each other, each flange including at least one radial section, the at least one radial section being deflectable against an edge of the tape as the tape is spooled onto the hub and to ensure uniform stacking of the tape; and
    each radial section being defined by a pair of radially extending groove cutouts, each groove cutout having a first end defined substantially adjacent the hub and a second end defined at an outer diameter edge of the flange.

15. The tape cartridge of claim 14 wherein a radial force causes the radial sections to deflect towards each other such that when the tape is fully spooled on the hub, the inner surfaces of each radial section are in parallel relationship with each other.

16. The tape cartridge of claim 15 wherein the radial sections return to a non-deflected position as the tape is un-spooled from the hub.

17. A reel for spooling tape uniformly thereon, the reel comprising:
    a hub rotatably mounted about an axis of rotation;
    two flanges, each flange having an outer surface and an inner surface, the flanges being located on opposite sides of the hub and being in spaced apart relationship along the axis of rotation, the inner surfaces of the flanges facing each other, the flanges extending outwardly from the hub in a diverging relationship with each other,
    a deflectable radial section defined by one of the flanges, the radial section being deflectable against a tape edge; and
    a deflectable spring section defined adjacent the deflectable radial section, the spring section being deflectable by a radial force exerted on the hub as tape is spooled thereon.

* * * * *